Dec. 20, 1955 — F. A. LINDLEY — 2,727,738
SHOCK MOUNT
Filed March 19, 1953 — 2 Sheets-Sheet 1
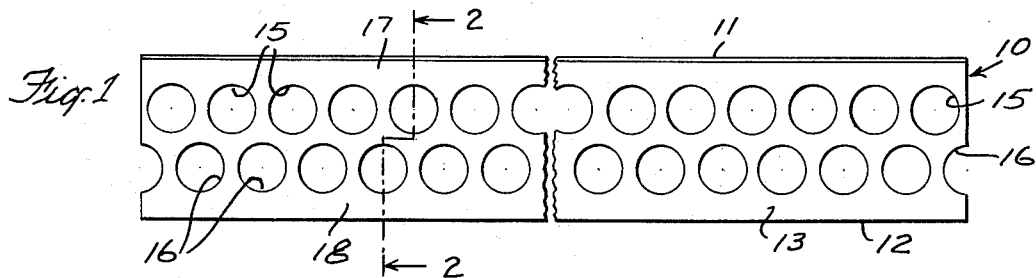
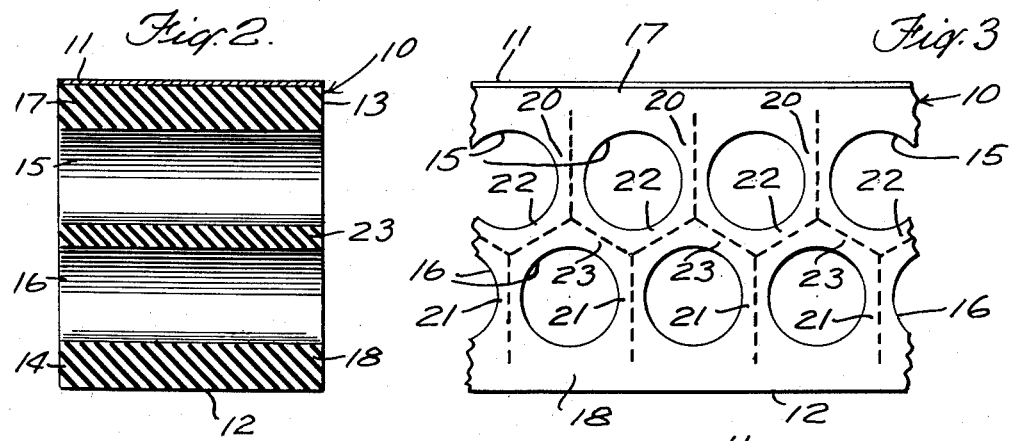
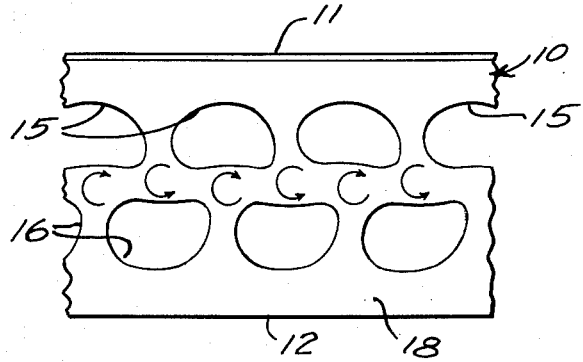
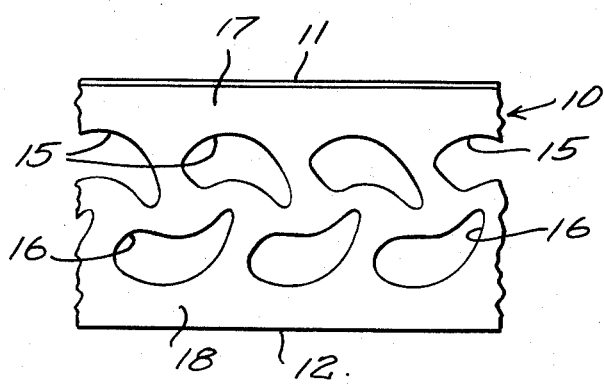
INVENTOR.
FREDERICK A. LINDLEY
BY Victor D. Borst
ATTORNEY Dec. 20, 1955  F. A. LINDLEY  2,727,738
SHOCK MOUNT
Filed March 19, 1953  2 Sheets-Sheet 2
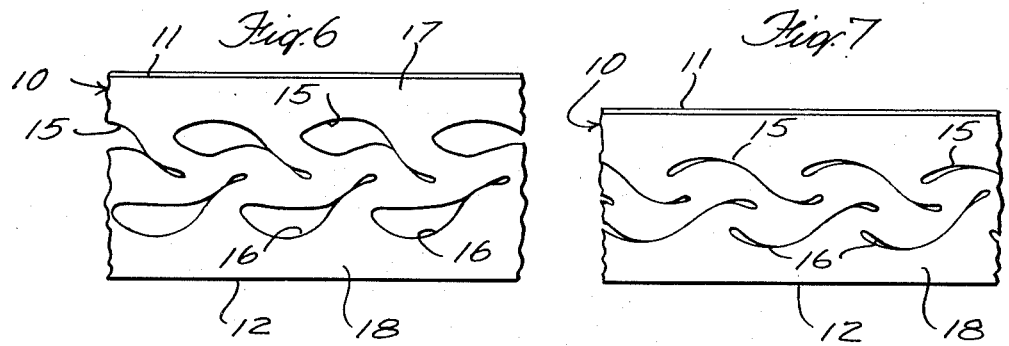
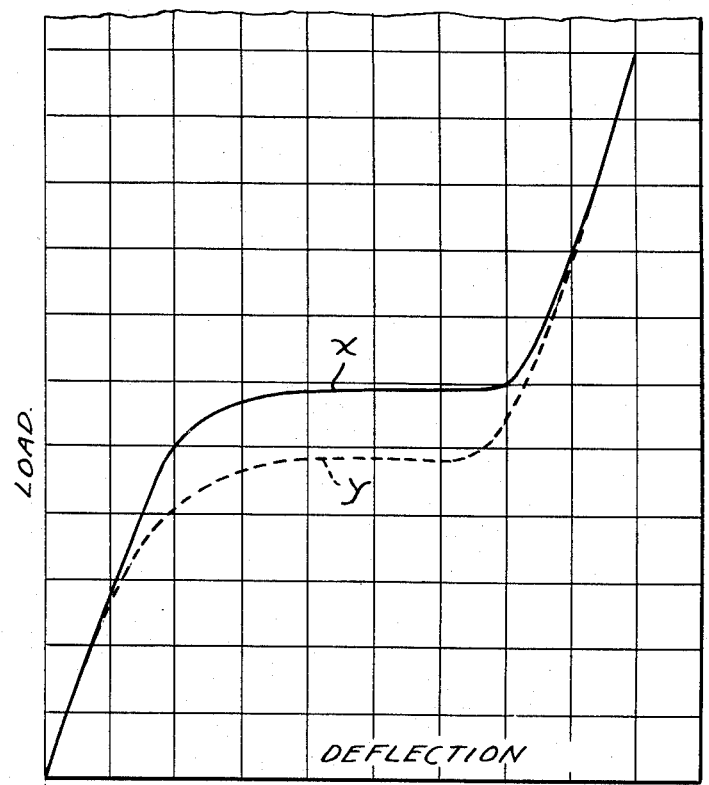
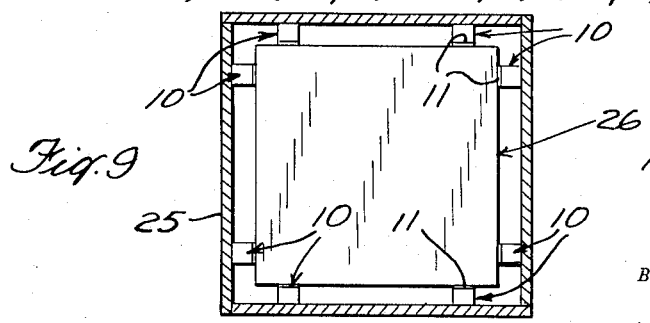
INVENTOR.
FREDERICK A. LINDLEY
BY Victor D. Borst
ATTORNEY

United States Patent Office 2,727,738
Patented Dec. 20, 1955

2,727,738

SHOCK MOUNT

Frederick A. Lindley, Flushing, N. Y., assignor to Smith-Meeker Engineering Co., New York, N. Y., a corporation of New York Application March 19, 1953, Serial No. 343,360

3 Claims. (Cl. 267—1)

This invention relates to means for protecting bodies from excessive shock due to sudden deceleration. Such means are commonly known as shock mounts and in the form contemplated herein comprise fabricated plastic pads or cushions which are designed to absorb the energy of the decelerated body with a given deflection and within the load tolerance of the body.

The work done by such a mount in absorbing the energy of a moving body, for example, is represented by the area under a load-deflection curve. The character of the load-deflection curve depends upon the characteristics of the mount. With the conventional coil spring as a shock absorber, the ratio between the load or deflecting force and deflection is substantially a straight line function with the result that in order to perform the work necessary to bring the body to rest, the deflection factor is substantial. Where the possibilities of deflection are limited, the load factor must be correspondingly increased in order to perform a definite amount of work.

Such will be the case, for instance, in protecting crated fragile bodies against the hazards of transportation, with which it is obvious that the deflection afforded by the cushioning mounts is necessarily limited. The desideratum therefore is to minimize the deflection until the opposing force assumes the permissible maximum within the limits of safety and then, without substantial further increase of that force, to apply that force over the permissible range of deflection of the mount until the foot-pounds exerted by the mount equal those of the decelerated body.

An ideal mount therefore would be one in which the characteristic load-deflection curve is rectangular or nearly so, the vertical component of which represents force and the horizontal component represents deflection. The opposing force builds up until the predetermined load that the body can safety withstand is nearly reached, allowing a sufficient factor of safety, and then the mount immediately gives way without substantially increasing its resisting force and applies that force through its deflection until sufficient work is done to absorb and counteract the energy of the body.

An object of this invention is to provide a shock mount which will in its performance approximate such an ideal characteristic curve.

More specifically it is an object of the invention to provide a shock mount which offers a large deflection compared to its overall dimension in the direction of deflection.

Another object is to provide a shock mount which has a high degree of self dampening and prevents natural resonances from building up.

Other objects and advantages of the invention will appear from the particular description of the illustrated embodiment of the invention.

In accordance with the invention the mount consists of a block of resilient material, such as rubber, with holes running crosswise to the direction of compression. There are two rows of uniform, equally spaced holes which are relatively offset or staggered in the two rows. The zone between each row and its adjacent pressure face is solid and the holes are round in cross section.

Thus opposing each hole is a column of material which is bounded by the two holes immediately on either side in the other row and has solid backing to the opposing pressure face. Each column is connected to two branching arms which in effect constitute an arch over a hole, each arm being common to two reverse arches and each column being connected centrally to the top of an arch in the unloaded condition of the mount.

When the material is compressed the columns bear down on the arches, causing a compressive shear action in the branching arms constituting the arches to take place. Eventually the arch and column structure tends to collapse, giving rise to a substantially horizontal part to the curve until the holes are substantially closed, after which the mount has little cushioning effect.

Due to the round shape of the holes the three armed structures comprising each a column and its two branching arms tend upon collapse to rotate one way or the other under compression about their meeting point as a center and this tends to distort the holes longitudinally of the mount, but nevertheless the arches go through a reversal after which further working of the material is due to deflection without substantial increment of force.

The proportioning of the holes is somewhat empirical depending upon the desired characteristics such as deflection, the durometer of the material and the particular application of the mount. The maximum deflection bears a relationship to the hole area per unit of block length as compared with the area of the block. If, for example, the area of the holes represents 50% of the area of the block, deflection of approximately 50% can occur, depending upon such factors as the durometer of the material and the diameters and hence the number and spacing of the holes for a given percentage of hole area.

Another feature of the invention is the approximate uniformity of cross sectional area of material disposed between the cavities, the hole size, proportioning of cavities and spacing being designed to achieve this disposition of material. Thus the material is uniformly stressed and the collapse point is simultaneously reached in the various parts of the structure. This gives rise to the greater prominence of the collapsing action.

Other features of the invention will appear from the following description of the embodiment of the invention shown in the accompanying drawings in which:

Fig. 1 is a side face view of a shock mount embodying the invention;

Fig. 2 is a cross section of the same on line 2—2 of Fig. 1;

Fig. 3 is an enlarged side view of a section of the mount shown in unloaded condition;

Figs. 4, 5, 6 and 7 are similar views of the same section shown under conditions at progressive stages of a complete loading;

Fig. 8 is a diagram of the load-deflection curve for a complete work cycle; and

Fig. 9 is a sectional view of a crated package illustrating a manner of using the mounts.

The illustrated shock mount consists of a block 10 of resilient material in the form of an elongated flat strip. The block is provided with cavities or holes which extend through the material in the dimension parallel with the elongated flat faces which constitute the pressure faces. As shown, the elongated block has pressure faces 11 and 12 and parallel side faces 13 and 14. The holes are tubular, being round in cross section and are disposed in two parallel rows, those in one row being numbered 15 and those in the other row being numbered 16. The holes in the two rows are symmetrically staggered and are of uniform size and the spacing is uniform throughout the rows and the rows are so spaced that each hole in one row is approximately the same distance from the two adjacent holes in the other row as it is from each of the two adjacent holes in the same row.

As shown, the two rows of holes are also substantially equally spaced from their respective pressure faces, there being a solid zone 17 between the row 15 and face 11 and a solid zone 18 between the row 16 and the face 12. Also, as shown, the holes are so proportioned that they represent about 50% of the cross sectional area of the block which with proper durometer of the material is calculated to give a satisfactory working structure approximating the illustrated characteristic work curve.

As illustrated in Fig. 3, the material between the successive holes in each row constitutes columnar bodies or columns of hour glass shape backed on their outer ends by the solid zones 17 and 18, respectively, and the opposing columns are symmetrically offset and are joined at their inner ends by similar hour glass shaped sections of material. These connecting or intermediate sections constitute a series of reverse arches the centers of which on their convex sides are opposed by the columns on the respective sides.

While, as stated, the three arms of each individual three armed structure are of approximately the same cross sectional area, there may be, as shown, an appreciable disparity in favor of the intermediate or branching arms 22, 23 as compared with the columns 20, 21, the desideratum being to get a simultaneous collapse of all of the arms. Since the intermediate arms are subjected to compressive shearing action, it has been found that, especially with some materials, it is desirable to have the cross section area of the intermediate arms slightly greater than that of the columns in order to obtain the simultaneous collapse of the entire structure.

This is illustrated in Fig. 3 in which the axes of the columns and of the connecting sections are indicated by broken lines. The columns opposing face 11 and backed by zone 17 are numbered 20, those opposing face 12 and backed by zone 18 are numbered 21, and the intermediate sections connecting the columns and forming the successive reverse arches are numbered 22 and 23, respectively. Each column is thus an element in a three armed structure and each intermediate arm 22, 23 is an element of two arch structures.

From this it will be seen that when the mount is subjected to compression, this force is transmitted to the columns 20, 21 and the intermediate arms 22, 23 are subjected to a compressive shearing action as the columns bear down on the arches. Such deflection as occurs tends to flatten out the arches which eventually causes a collapse of the arches and columns and the work curve flattens off. In other words the deflection factor rapidly increases without further substantial increase in force or load.

As the arches flatten out the first effect is a translation of the common centers of the successive three-arm structures, causing the centers to shift longitudinally of the block. In just which direction the shifting or rotation will take place is not always predictable but necessarily all shift or rotate in the same direction. The physical consequence of this is illustrated in Fig. 4 to 7 and its operational effect is shown in the diagram of Fig. 8.

In the unloaded condition of the mount the load-deflection curve of Fig. 8 is at position A which is that of Fig. 3. As the load increases we reach the condition of Fig. 4 which is position B on the curve. As indicated by the arrows in Fig. 4 the three-arm structures rotate, in this case to the right and the holes are distorted, being elongated toward the right and their adjacent curved faces approaching a straight line. At this point the knee in the curve is reached and collapse of the arches is about to occur.

As above pointed out, due to the substantial equality of cross section of the arms the material is uniformly stressed and the collapse is simultaneous in all parts of the structure. Hence from point B large deflection occurs with small increment of loading. In Fig. 5 which is point C in the curve the arches have reversed and the center of the plateau portion of the curve is reached.

The next stage is where the holes begin to bottom as shown in Fig. 6, and we have reached the end of the plateau period as indicated by position D in the curve.

Further deflection occurs only with increase in load, until eventually the holes become substantially closed, as shown in Fig. 7 which is point E on the curve. Thereafter, since the holes are closed and the material is incompressible, there is little or no more cushioning effect.

For safety it is necessary that the mount be designed for a particular application so that point B is reached within the load tolerance of the body being cushioned.

The full line curve X in Fig. 8 defines the work on the loading or first half of the work cycle and the broken line curve Y defines the work on the recoil or second half of the cycle. The area between the two curves indicates the foot-pounds of energy absorbed in completely compressing the block and releasing it through one cycle.

This characteristic together with the approximation to the ideal rectangular characteristic of the load deflection curve is very desirable in connection with vibration problems for it prevents natural resonances from building up. The curve characteristic represents a varying mechanical compliance with deflection. Thus when a particular vibrating frequency would tend to build up an amplitude due to mechanical resonance of the equipment on the shock mount, the larger resulting deflection changes the compliance and shifts or detunes the resonance of the system. In addition the large hysterisis characteristic with large deflections absorbs large amounts of energy per cycle which gives a high degree of dampening. Low amplitude, high frequency vibrations are effectively isolated when they have to travel a relatively large distance through the mass of the shock mount.

Fig. 9 illustrates one manner of using the shock mounts, namely, by attaching the mounts to the several inner faces of the outside crate within which the mounted equipment which is to be cushioned is contained. The mounts are shown on each inner face of the outer crate 25 and the face 12 of each of the blocks 10 is cemented to the crate wall, the blocks being parallel and with their faces 11 bounding a rectangular space for snugly receiving the mounted equipment 26. The faces 11 of the mounts will be treated to cause the equipment to slip easily over them so that it may be inserted into the space within and contacting the several mounts. For this purpose the mounts may have their faces 11 covered with some fabric such as duck.

It will be understood that the invention is not to be limited to proportions and other details of construction represented in the illustrated embodiment except in conformity with the scope of the appended claims.

What is claimed is:

1. A shock mount comprising a block of substantially incompressible resilient pliable material having parallel pressure faces and spaced tubular open ended cavities therein with their axes parallel to the pressure faces, the cavities being round in cross section and disposed in two rows, the centers of each row being in a plane parallel to the pressure faces with the cavities of uniform size and equally spaced in their respective rows and the cavities in the two rows being relatively symmetrically offset, the spacing between the centers of the cavities in the two rows being such that the cavities of the two rows overlap a substantial amount and the bodies of material between all adjacent cavities are of hour glass shape the cross sections of which are sufficiently alike to effect simultaneous collapse of all of said bodies of material, the material between each row and its adjacent pressure face being solid.

2. A shock mount as defined in claim 1 in which the spacing between the centers of the cavities in each row is somewhat less than the spacing between the centers of adjacent cavities in opposite rows, whereby the cross sectional area of material disposed between adjacent cavities in opposite rows exceeds that between adjacent cavities in the same row.

3. A shock mount as defined in claim 1 in which the aggregate cross sectional area of the cavities is substantially 50 percent that of the mount.

References Cited in the file of this patent

UNITED STATES PATENTS

| | | |
|---|---|---|
| 1,195,735 | Roberts | Aug. 22, 1916 |
| 2,322,193 | Kaemmerling | June 15, 1943 |
| 2,371,788 | Weeber | Mar. 20, 1945 |

FOREIGN PATENTS

| | | |
|---|---|---|
| 1,920 | Great Britain | of 1884 |